US008156480B2

(12) United States Patent
Wu et al.

(10) Patent No.: US 8,156,480 B2
(45) Date of Patent: Apr. 10, 2012

(54) METHODS AND APPARATUS TO FORM A RESILIENT OBJECTIVE INSTRUCTION CONSTRUCT

(75) Inventors: Youfeng Wu, Palo Alto, CA (US); Cheng Wang, Santa Clara, CA (US); Ho-Seop Kim, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1594 days.

(21) Appl. No.: 11/537,287

(22) Filed: Sep. 29, 2006

(65) Prior Publication Data

US 2008/0127132 A1 May 29, 2008

(51) Int. Cl.
*G06F 9/45* (2006.01)
(52) U.S. Cl. ........................................................ 717/140
(58) Field of Classification Search .................. 717/140
See application file for complete search history.

(56) References Cited

U.S. PATENT DOCUMENTS

| 6,681,383 B1 * | 1/2004 | Pastor et al. ............... 717/126 |
| 2008/0040722 A1 * | 2/2008 | Kelem et al. ............... 718/104 |

OTHER PUBLICATIONS

Eric Rotenberg, "AR-SMT: A Microarchitectural Approach to Fault Tolerance in Microprocessors", Proceedings of the 29th Annual International Symposium on Fault-Tolerant Computing, 1999, 8 pages.

Ravi Rajwar, Maurice Herlihy, Konrad Lai, "Virtualizing Transactional Memory", Proceedings of the 32nd Intl. Symposium on Computer Architecture (ISCA'05), 2005 IEEE, 12 pages.
George A. Reis, Jonathan Chang, Neil Vachharajani, Ram Rangan, David I. August, "SWIFT: Software Implemented Fault Tolerance", Proceedings of the Intl. Symposium on Code Generation and Optimization (CGO'05) 2005 IEEE, 12 pages.
Kevin E. Moore, Jayaram Booba, Michelle J. Moravan, Mark D. Hill, David A. Wood, "LogTM: Log-based Transactional Memory", Proceedings of the 12th Annual Intl. Symposium on High Performance Computer Architecture (HPCA-12), Austin, TX, Feb. 11-15, 2006, 12 pages.
Shubhendu S. Mukherjee, Michael Kontz, Steven K. Reinhardt, "Detailed Design and Evaluation of Redundant Multithreading Alternatives", 2002 IEEE, 12 pages.
T. Anderson and R. Kerr, "Recovery Blocks in Action: a system supporting high reliability", Proceedings of the 2nd international conference on Software engineering, Oct. 1976, 11 pages.
Edson Bonin, Cheng Wang, Youfeng Wu, and Guido Araujo, "Software-Based Transparent and Comprehensive Control-Flow Error Detection", Proceedings of the Intl. Symposium on Code Generation and Optimization (CGO'06), 2006 IEEE, 13 pages.
C. Scott Ananian, Krste Asanovic, Bradley C. Kuszmaul, Charles E. Leiserson, Sean Lie, "Unbounded Transactional Memory" Proceedings of the 11th Intl. Symposium on High-Performance Computer Architecture (HPCA-11 2005), 2005 IEEE, 12 pages.
Cheng C. Wang and Youfeng Wu, U.S. Appl. No. 11/325,925, filed on Dec. 30, 2005, entitled Apparatus and Method for Redundant Software Thread Competition, 40 pages.

* cited by examiner

*Primary Examiner* — John Chavis
(74) *Attorney, Agent, or Firm* — Hanley, Flight & Zimmerman, LLC

(57) ABSTRACT

Methods and an apparatus to form a resilient objective instruction construct are provided. An example method obtains a source instruction construct and forms a resilient objective instruction construct by compiling one or more resilient transactions.

30 Claims, 8 Drawing Sheets

METHODS AND APPARATUS TO FORM A RESILIENT OBJECTIVE INSTRUCTION CONSTRUCT

TECHNICAL FIELD

This disclosure relates generally to software and/or firmware program and/or instruction management and, more particularly, to methods and apparatus to form a resilient objective instruction construct.

BACKGROUND

As transistors that are integrated to form electronic hardware, such as processors, become smaller and faster, electronic hardware formed from these transistors becomes more susceptible to hardware faults. Without regard to cause, these errors may result in incorrect software and/or firmware program execution by altering signal transfers or stored values. With many-core computer platforms, recovery from these incorrect program executions is critical. Leaving aside incorrect program execution, the overhead time spent synchronizing threads (e.g., tasks, code streams) execution is an appreciable portion of execution time; considering incorrect program execution, the time spent managing execution (e.g., synchronization and error detection) becomes substantially greater.

Hardware failure mechanisms, whose cause may immensely vary, are generally classified according to duration in a faulted state as either permanent or transient errors. A permanent error refers to a lasting damage of a device from which recovery from the damage is not attained. For example, a permanent error may result from a damaged memory cell or register. Alternatively, transient errors (i.e., soft-errors, single-event upsets, SEUs), are short-term disturbances that change the internal logical state of a device (e.g., processor, memory, etc.) without causing permanent damage to the device. Computer platforms having complete fault-tolerance must be capable of handling both error types, while minimizing execution latency.

Most modern microprocessors already incorporate certain mechanisms for detecting transient errors, such as soft-core errors, through hardware. Memory elements, particularly caches of modern systems, are protected by mechanisms such as error-correcting codes ("ECC") and parity checking. The error protection in these systems is typically focused on memory because such techniques are well understood and do not require expensive extra circuitry. Moreover, caches take up a large part of the chip area in modern microprocessors. Hardware-based approaches to error correction generally rely on inserting redundant hardware.

As mentioned above, difficulties in managing thread concurrency are appreciable, and with increasing cores on computing platforms these difficulties become increasingly appreciable. In resolution, a method of execution using transactional memory has been proposed to simplify concurrency management by supporting parallel tasks, i.e., transactions, that appear to execute atomically and in isolation. Using transactions and/or transactional memory, multi-core computer platforms can achieve increased parallel performance with identified coarse-grained transactions.

When using transactional approaches, programmers define atomic code sequences (i.e., transactions) that may include unstructured flow control and any number of memory references. The transactional memory system executes transactions correctly by generally providing: (1) atomicity, which means that either the whole transaction executes or none of it; (2) isolation, which means that partial memory updates are not visible to other transactions; and (3) consistency meaning there appears to be a single transaction completion order across the entire system. If these conditions are met at the end of its execution, the transaction commits its writes to shared memory. If not, the transaction violates one or more of these conditions, and the transaction writes are rolled back.

DETAILED DESCRIPTION

1. Transaction Instruction Construct

Figure 1:
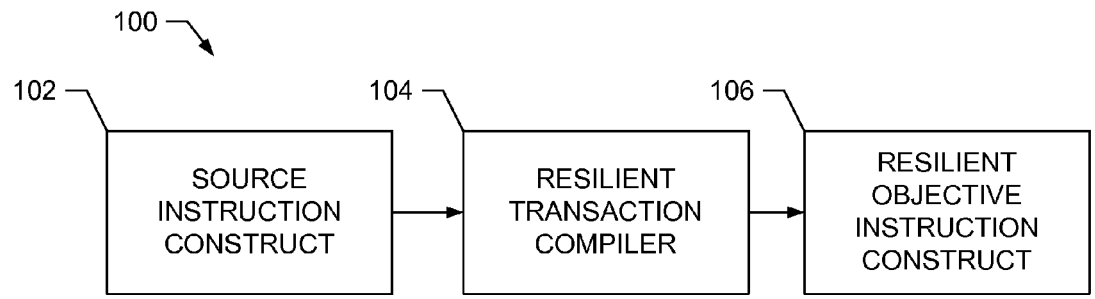
FIG. 1 is an illustration of an example flow of forming a resilient objective instruction construct.

As described above, transactions are designated code sequences that execute atomically (i.e., either does not execute or fully executes) and in isolation when executed on a computing platform. Associated with the execution of transactions may be a transactional memory, which provides a mechanism to buffer-store values of transactions until a designated commit time at which the values will be written to shared memory. Transactions and transactional memory are well known to persons of ordinary skill in the art. Using the resilient transaction technique disclosed herein, errors or other interferences incurred during execution can be detected, handled, and/or recovered. By composing these resilient transactions, software can be designed with high reliability.

As described in detail below, by modifying a source instruction construct, resilient transactions can be formed such that, when executed, the resilient transaction are capable of detecting and/or recovering from errors or other interferences. Throughout the source instruction construct, varying levels of resiliency can be designated. By designating these varying levels of resiliency, sections of the source instruction construct may be designated for no resiliency (i.e., a section of the source instruction construct remains unchanged) or some resiliency (i.e., a section of the source instruction construct requires modified instructions). Consequently, resilient transactions may include varying levels of resiliency including varying levels of accuracy and overheads associated with error detection and error recovery.

The pseudocode examples herein are examples of a transaction construct and syntax. The transaction construct and syntax is designated by a starting syntactical instruction "Atomic", an atomic sequence of instructions enclosed by syntactical braces "{ }", and a closing syntactical instruction "orelse" that denotes a next sequence of instructions. An additional syntactical instruction within the transaction construct may include a "abort" instruction, which aborts an execution of the current transaction, rolls back any changes made during execution, and sequences the execution to the denoted next sequence of instruction (i.e., after the syntactical instruction "orelse"). In any manner of transaction manager implementations (e.g., asynchronous transaction aborts, synchronous transaction aborts), the embodiments discussed herein provide example instructional to implement transaction aborts without limitation to transaction manager implementations.

Also, as described in detail below, the "abort" instruction provides an instruction to abort an executing error-detecting transaction, when the instruction sequence identifies an error or any other interference based on a mismatch of a logical instruction result (i.e., an instruction in the schematic) and a physical instruction result (i.e., an instruction in the execution). Further, the "abort" instruction provides an instruction to sequence execution from the error-detecting transaction to subsequent instruction(s) to handle and/or recover from the identified error or any other interference. The subsequent instruction(s) may provide error-recovery instruction that may repeat the instruction sequence of the previous error-detecting transaction, execute a different instruction sequence than the previous error-detecting transaction, execute an instruction sequence to report the error, or execute any other transaction to handle and/or recover from the identified error. For example, these subsequent instruction(s) may invoke runtime instruction such as, for example, operating system calls to create a new thread or any other known or future ways to migrate threads on an example computing platform. Also, as described in detail below, the subsequent instruction(s) may further determine the type of error, such as permanent errors resulting from a damaged core, permanent errors resulting from damaged memory registers, transient errors resulting from a transient interference (e.g., cosmic rays, voltage disturbances, etc.). In addition to identifying the faulted equipment, if any, the error-recovery instructions are capable of minimizing the overhead time spent on execution such as, repeating the instruction execution on the same core.

Also, as described in detail below, the transaction instruction construct may be extended to include a syntactical instruction, such as "orelse stop on error", which designates an executing transaction stop without executing error-recovery instructions. For instance, the instruction may stop an error-detecting transaction from continuing to execute after an error, wherein the error-detecting transaction cannot recover from or does not necessitate error recovery. Also, the transaction instruction construct is extended to include a syntactical instruction "orelse on same core", which designates an execution of sequent instruction(s) to a same core as a previous executed instruction. Also as described in detail below, the transaction instruction construct may be extended to include a syntactical instruction, such as "orelse on different core", which designates an execution of sequent instruction(s) to a different core as a previous executed instruction. Further, the transaction construct and/or syntax may be implemented to designate execution for a specific core, designate a repetition of instruction(s) for a specific core, and/or disable execution by a specific core.

As will be appreciated by persons of ordinary skill in the art, the transaction construct and syntax serves as rules for forming machine executable code, and variants in the transaction construct and syntax can produce the same or similar machine executable code. Additionally, some pseudocode examples are shown with an example pseudocode relating to an IA-32 instruction architecture; however, persons of ordinary skill in the art will appreciate that such example techniques described herein can be implemented on other microprocessor instruction set architectures ("ISAs"), such as an EM64T architecture, an IA-64 architecture, etc.

2. Instruction Compilation

FIG. 1 is a schematic illustration of an example system flow 100 including a source instruction construct 102, a resilient transaction compiler 104, and a resilient objective instruction construct 104. The source instruction construct 102 may be in any form of a computer language, including a human-readable source code or machine executable code. As described below, the resilient transaction compiler 104 is capable of reading the source instruction construct 102 and producing a resilient objective instruction construct 106. The resilient objective instruction construct 106 may be in any form of a computer language, which can be subsequently executed by an objective computing platform.

Figure 2:
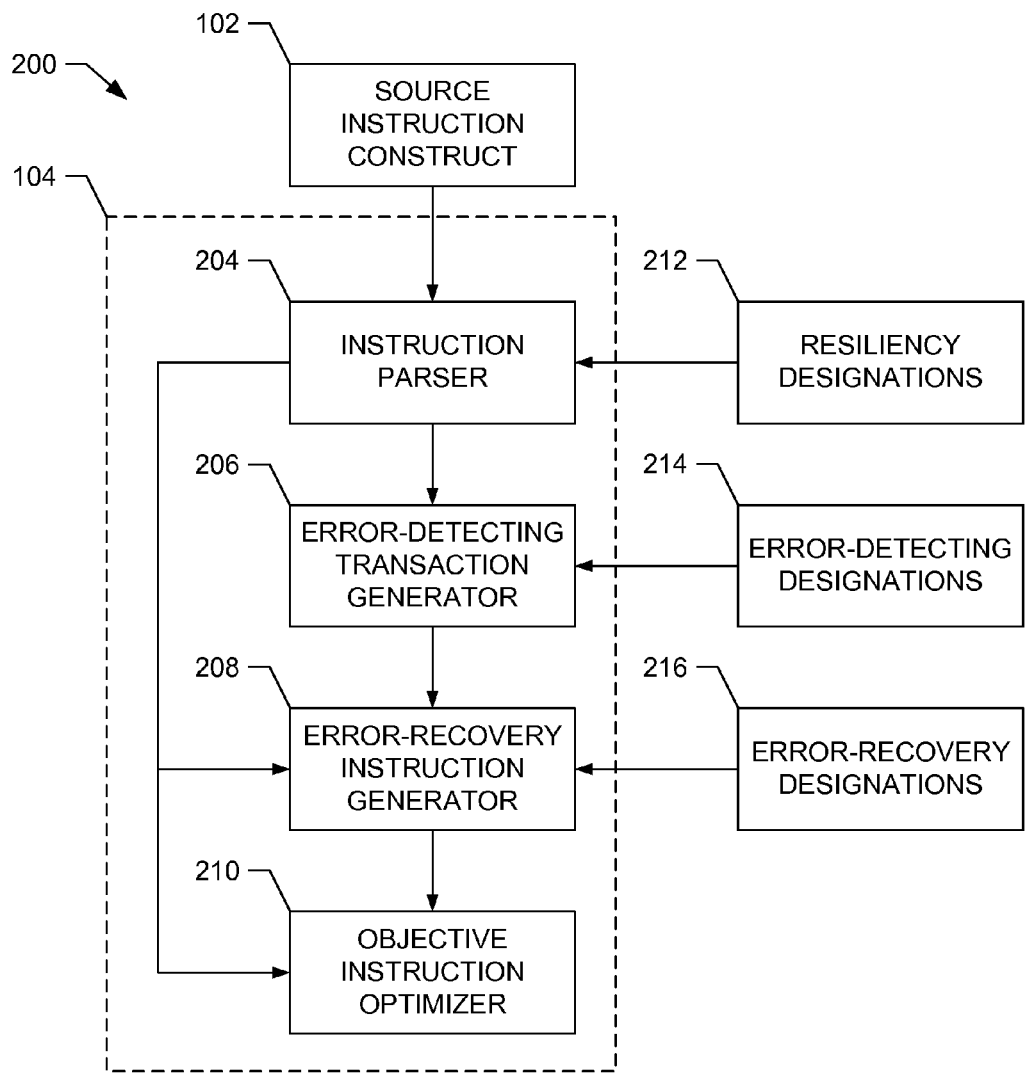
FIG. 2 is a schematic illustration of an example system to create a resilient objective instruction construct.

FIG. 2 is a schematic illustration of an example system 200 to implement a system using the example resilient transaction compiler 104 of FIG. 1. The example system 200 includes a schematic illustration of an example resilient transaction compiler 104 of FIG. 1. The example resilient transaction compiler 104 of FIG. 2 includes an instruction parser 204, an error-detecting transaction generator 206, an error-recovery instruction generator 208, and an objective instruction optimizer 210. Additionally, the example resilient transaction compiler 104 of FIG. 2 is capable of receiving resiliency designations 212, error-detecting designations 214, and error-recovery designations 216. Also shown in FIG. 2 is an example source instruction construct 102 of FIG. 1.

The instruction parser 204 of the example resilient transaction compiler 104 of FIG. 2 is capable of reading the example resiliency designations 212 and parsing sections of the source instruction construct 210 for generating any combination of error-detecting transactions and/or error-recovery instructions, or optimizing the resilient objective instruction construct. For the purposes of the instruction parser 204, the example resiliency designations 212 differentiates sections of the source instruction construct 102 of FIG. 2 as sections requiring varying levels of resiliency. The example resilient designations 212 may be in the form of one or more instruction statements in a programming language (i.e., high-level language, assembly language, etc.), or other designations used by an example compiler (i.e., lexical identifier, symbol, keyword, etc.). Further, the example resilient designations 212 may be specified by a programmer. For example, a first portion of the source instruction construct 102 of FIG. 2 may be designated as not requiring error-detection and a second portion of the source instruction construct 102 of FIG. 2 may be designated as requiring error-detection. The example instruction parser 204 is capable of passing the first portion of the source instruction construct 102 of FIG. 2 to the objective instruction optimizer 210, as no modifications are required to the first portion of the source instruction construct 102 of FIG. 2, and parsing the second portion of the source instruction construct 102 of FIG. 2, for example, to the error-detecting transaction generator 206.

As discussed above, the example resilient transaction compiler 104 of FIG. 2 includes the example error-detecting transaction generator 206. The example error-detecting transaction generator 206 is capable of receiving a section of the example source instruction construct 102 of FIG. 2 requiring error-detection, receiving the example error-detecting designations 214, generating error-detecting instructions, and modifying the passed section to form an error-detection transaction. As resilient transactions may vary in levels of resiliency, the error-detecting transaction generator 206 is capable of generating varying error-detecting transactions dependent on the error-detecting designations 214. The example error-detecting transaction generator 206 is described in further detail below along with FIGS. 3, 4, and 5.

Also, as discussed above, the example resilient transaction compiler 104 of FIG. 2 includes the example error-recovery instruction generator 208. The example error-recovery instruction generator 208 is capable of receiving a section of the example source instruction construct 102 of FIG. 2 requiring error-recovery, receiving the example error-recovery designations 216, and modifying the passed section to form error-recovery instructions. As resilient transactions may vary in levels of resiliency, the error-recovery instruction generator 206 is capable of generating varying error-recovery instructions dependent on the error-recovery designations 216. The example error-recovery instruction generator 206 is described in further detail below along with FIG. 6.

The example resilient transaction compiler 102 of FIG. 2 also includes the objective instruction optimizer 210 of the example resilient transaction compiler 104 of FIG. 2 assembles the passed sections of the source instruction construct 102 of FIG. 2, along with the transactions generated from the error-detecting transaction generator 206 and the error-recovery instructions generated from the error-recovery instruction generator 208. To form the resilient objective instruction construct, the objective instruction optimizer 210 may remove, add, reorder, or otherwise change instructions to minimize redundant attributes of the generated code generated from the error-detecting transaction generator 206 and the error-recovery instruction generator 208, and the unchanged sections of the source instruction construct 102 of FIG. 2.

Figure 3:
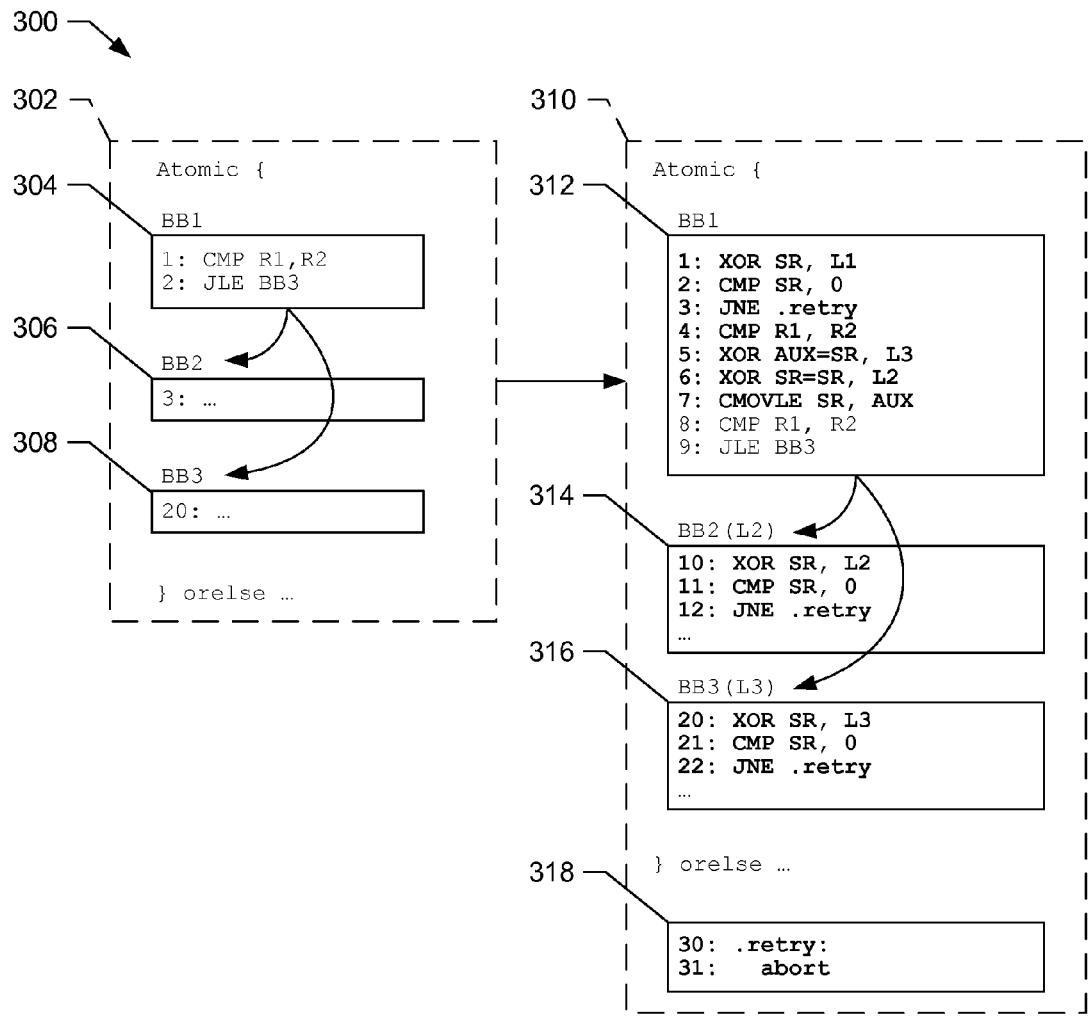
FIG. 3 is a first illustrative portion of pseudocode of an example source instruction construct and a resulting example error-detecting transaction formed by the example system of FIG. 2.

FIG. 3 provides illustrative pseudocode of an example source instruction construct 302, which is inputted by the instruction parser 204 and passed to the example error-detecting transaction generator 204 of FIG. 2. From the passed example source instruction construct 302 and an example designation 214 of FIG. 2 of a control flow error-detection, the example error-detecting transaction generator 204 of FIG. 2 forms an example error-detecting transaction 310. Also shown in FIG. 3, the example source instruction construct 302 is modified such that, when the example error-detecting transaction 310 is executed, a mismatch of a logical branch target (i.e., a branch target in a schematic) and a physical branch target (i.e., a branch target in the execution) is detected. The added instructions are shown in boldface type throughout the example error-detecting transaction 310. In the example error-detecting transaction 310, a signature register ("SR"), which syntactically designates a particular register. The particular register can be, for example, a general purpose register that stores a memory address. In FIG. 3, a plurality of line numbers are offset by colons to represent a sequential instruction stream. In the discussion herein, the line number is provided, as a parenthetical expression (i.e., line #), for a reference to the respective instruction on the line number.

Upon execution, the example source instruction construct 302 begins with the first basic block 304 with a compare ("CMP") instruction (line 1), which compares a first operand of a first register ("R1") with a second operand of a second register ("R2"). The CMP instruction subtracts the second operand of the second register R2 from the first operand of the first register R1 and sets a carry, a sign, a zero, and an overflow flag depending on whether the subtraction results in a carry out, a negative number, a zero, or an overflow, respectively.

Following the CMP instruction (line 1), the first basic block 304 follows with a jump-if-less-than-or-equal instruction ("JLE") (line 2), which checks the carry, overflow, and zero flags and jumps to a specified target instruction ("BB3") associated with the third basic block 308 (line 20) if the carry, overflow, and zero flags indicate the first operand of the first register R1 is less than or equal to the second operand of the second register R2. If the carry, overflow, and zero flags indicate the first operand of the first register R1 is greater than the second operand of the second register R2, the example source instruction construct 302 continues to the second basic block 306 (line 3).

As illustrated within the example source instruction construct 302, a branch instruction (e.g., the JLE instruction) provides an instruction that enables a control transfer from a first sequential instruction stream (e.g., the first basic block 304) to either a second sequential instruction stream (e.g., the second basic block 306) or a third sequential instruction stream (e.g., the third basic block 308). When an error or other interference occurs, the branch instruction may cause the control transfer to deviate from a correct sequential instruction stream of execution, such as jumping to the second basic block 306 instead of the third basic block 308. Although the branch instruction may exhibit the error, the error may occur earlier in an instruction sequence, such as the CMP instruction (line 1). Moreover, although the example source instruction construct 302 exhibits the first basic block 304 with the branch instruction predicated on a single instruction, such as the CMP instruction (line 1), the first basic block 304 may be implemented with a plurality of instructions that may effect the branch instruction.

The example error-detecting transaction 310 includes results from the processing of the example instruction construct 302 by the example error-detecting transaction generator 206. Upon execution the example error-detecting transaction 310 begins with the first basic block 312 with an exclusive-or ("XOR") instruction (line 1), which performs a bitwise exclusive-or operation on a first operand of the signature register SR and a second operand of a constant ("L1"), and stores a result of the bitwise exclusive-or operation to the signature register SR. Additionally, the XOR instruction (line 1) clears the carry and overflow flags, and sets the sign and zero flags according to the result. In the example, the constant L1 determined constant that sets the signature of the first basic block 312. After the XOR instruction (line 1), the first basic block 312 follows with a CMP instruction (line 2), which compares a first operand of the signature register SR with a second operand of 0. The CMP instruction (line 2) subtracts the second operand of 0 from the first operand of the signature register SR and sets the carry, sign, zero and overflow flags depending on whether the subtraction results in a carry out, a negative number, a zero, or an overflow, respectively. After the CMP instruction (line 2), the first basic block 312 follows with a jump-if-not-equal instruction ("JNE") (line 3), which checks the zero flag and jumps to the location of ".retry" (line 30) if the zero flag indicates the first operand of the signature register SR is not equal to the second operand of 0. In the instance of the jump to the ".retry" location (line 30), the "abort" instruction (line 31) aborts the example error-detecting transaction 310. If the zero flag indicates the first operand of the signature register SR is equal to the second operand of 0, the first basic block 312 follows with a CMP instruction (line 4).

The CMP instruction (line 4) compares a first operand of a first register ("R1") with a second operand of a second register ("R2"). The CMP instruction (line 4) subtracts the second operand of the second register R2 from the first operand of the first register R1 and sets the carry, sign, zero, and overflow flag depending on whether the subtraction results in a carry out, negative number, zero, or overflow, respectively. After the CMP instruction (line 4), the first basic block 312 follows with an XOR instruction (line 5), which performs a bitwise exclusive-or operation on a first operand of the signature register SR and a second operand of a constant ("L3"), and stores a result of the bitwise exclusive-or operation to an auxiliary register ("AUX"). In the example, the constant L3 can be a determined constant that sets the signature of the third basic block 316. After the XOR instruction (line 5), the first basic block 312 follows with an XOR instruction (line 6), which performs a bitwise exclusive-or operation on a first operand of the signature register SR and a second operand of a constant ("L2"), and stores a result of the bitwise exclusive-or operation to the signature register SR. In the example, the constant L2 can be a determined constant that sets the signature of the second basic block 314. After the XOR instruction (line 6), the first basic block 312 follows with a conditional move less-than-or-equal-to ("CMOVLE") instruction (line 7). The CMOVLE instruction (line 7) checks the overflow, sign, and zero flags and moves the value of the auxiliary register AUX to the signature register SR if the overflow, sign, and zero flags indicate the first operand of the first register R1 is less than or equal to the second operand of the second register R2, as indicated from the CMP instruction (line 4). If the carry, overflow, and zero flags indicate the first operand of the first register R1 is greater than the second operand of the second register R2, the CMOVLE instruction (line 7) does not move the value of the auxiliary register AUX to the signature register SR.

After the CMOVLE instruction (line 7), the first basic block 312 follows with a CMP instruction (line 9), which compares a first operand of the first register R1 with a second operand of the second register R2. The CMP instruction subtracts the second operand of the second register R2 from the first operand of the first register R1 and sets the carry, sign, zero, and overflow flags depending on whether the subtraction results in a carry out, a negative number, a zero, or an overflow, respectively. After the CMP instruction (line 9), the first basic block 312 follows with a JLE instruction (line 9), which checks the carry, overflow, and zero flags and jumps to a specified target instruction ("BB3") associated with the third basic block 316 (line 20) if the carry, overflow, and zero flags indicate the first operand of the first register R1 is less than or equal to the second operand of the second register R2. If the carry, overflow, and zero flags indicate the first operand of the first register R1 is greater than the second operand of the second register R2, the example error-detecting transaction 310 follows to the second basic block 344 (line 10). The CMP instruction (line 8) and the JLE instruction (line 9) are the original sequence from the first basic block 304 of the source instruction construct 302.

As described above, after the JLE instruction (line 8) the example error-detecting transaction 310 either follows to the second basic block 314 or the third basic block 316 depending on the values of the first register R1 and the second register R2. The second basic block 314 begins with an XOR instruction (line 10), which performs a bitwise exclusive-or operation on a first operand of the signature register SR and a second operand of the constant L2, and stores a result of the bitwise exclusive-or operation to the signature register SR. Additionally, the XOR instruction (line 10) clears the carry and overflow flags, and sets the sign and zero flags according to the result. As described above, the constant L2 is the determined constant that sets the signature of the second basic block 314. After the XOR instruction (line 10), the second basic block 314 follows with a CMP instruction (line 11), which compares a first operand of the signature register SR with a second operand of 0. The CMP instruction (line 11) subtracts the second operand of 0 from the first operand of the signature register SR and sets the carry, sign, zero and overflow flags depending on whether the subtraction results in a carry out, a negative number, a zero, or an overflow, respectively. After the CMP instruction (line 11), the second basic block 314 follows with a jump-if-not-equal instruction ("JNE") (line 12), which checks the zero flag and jumps to the location of ".retry" (line 30) if the zero flag indicates the first operand of the signature register SR is not equal to the second operand of 0. In the instance of the jump to the ".retry" location (line 30), the "abort" instruction (line 31) aborts the example error-detecting transaction 310. If the zero flag indicates the first operand of the signature register SR is equal to the second operand of 0, the second basic block 314 follows a designated instruction sequence. The designated instruction sequence is the designated instruction sequence from the second basic block 306 of the source instruction construct 302.

Similar to the second basic block 314, the third basic block 316 begins with an XOR instruction (line 20), which performs a bitwise exclusive-or operation on a first operand of the signature register SR and a second operand of the constant L3, and stores a result of the bitwise exclusive-or operation to the signature register SR. Additionally, the XOR instruction (line 20) clears the carry and overflow flags, and sets the sign and zero flags according to the result. As described above, the constant L3 is the determined constant that sets the signature of the third basic block 316. After the XOR instruction (line 20), the third basic block 316 follows with a CMP instruction (line 21), which compares a first operand of the signature register SR with a second operand of 0. The CMP instruction (line 21) subtracts the second operand of 0 from the first operand of the signature register SR and sets the carry, sign, zero and overflow flags depending on whether the subtraction results in a carry out, a negative number, a zero, or an overflow, respectively. After the CMP instruction (line 21), the third basic block 316 follows with a jump-if-not-equal instruction ("JNE") (line 22), which checks the zero flag and jumps to the location of ".retry" (line 30) if the zero flag indicates the first operand of the signature register SR is not equal to the second operand of 0. In the instance of the jump to the ".retry" location (line 30), the "abort" instruction (line 31) aborts the example error-detecting transaction 310. If the zero flag indicates the first operand of the signature register SR is equal to the second operand of 0, the third basic block 316 follows the designated instruction sequence. The designated instruction sequence is the designated instruction sequence from the third basic block 308 of the source instruction construct 302.

When the example error-detecting transaction 310 executes, an error or other interference during the execution can be detected because the error-detecting transaction 310 updates the signature register SR, such that between a beginning section of the first basic block 312 (e.g., line 1 of the first basic block 312) and an ending section of the first basic block 312 (e.g., line 6 of the first basic block 312) the signature register SR is a constant (e.g., 0). Also the example error-detecting transaction 310 updates the signature register SR, such that between the ending section of the first basic block 312 (e.g., line 7 of the first basic block 312) and a beginning section of the second basic block 314 (e.g., line 10 of the second basic block 314) the signature register SR is the signature of the second basic block 314 (e.g., the constant L2). Therefore, a first example error during execution that causes an incorrect jump, such as a jump to the third basic block 316 instead of the second basic block 314 can be detected by comparing the signature register SR with the signature (e.g., the constant L3) of the third basic block 316 (e.g., line 20 and line 21 of the third basic block 316). Similarly, a second example error during execution that causes an incorrect jump, such as to the middle of the first basic block 312 (e.g., line 4 of the first basic block 312) can be detected because the signature register SR is not a constant (e.g., 0) and will not store the next basic block signature correctly (e.g., line 5 of the first basic block 312) for a next comparison the signature register SR with the signature (e.g., the constant L3) of the third basic block 316 (e.g., line 20 and line 21 of the third basic block 316). In either the first or second example error, the transaction is aborted and a subsequent specified instruction is executed (e.g., line 3 of the first basic block 312, line 12 of the second basic block 314, line 22 of the third basic block 316).

Figure 4:
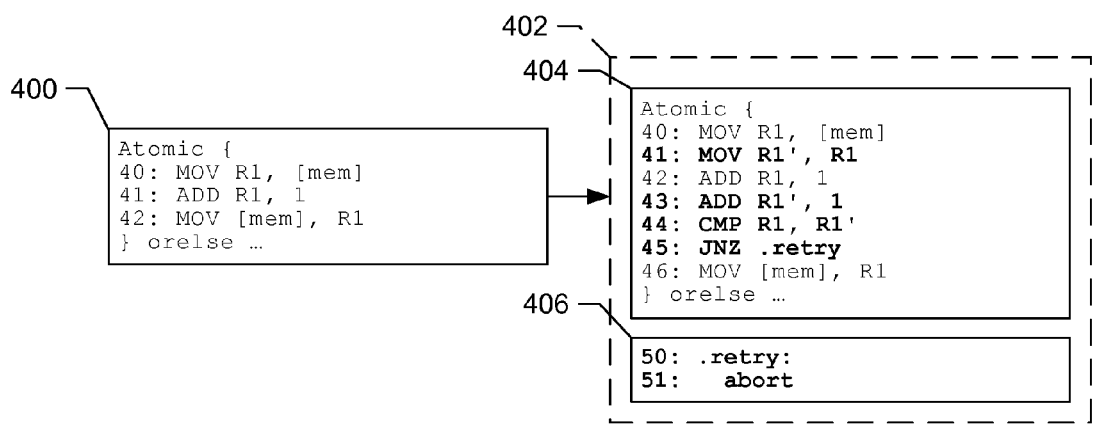
FIG. 4 is a second illustrative pseudocode of an example source instruction construct and a resulting example error-detecting transaction formed by the example system of FIG. 2.

FIG. 4 provides illustrative pseudocode of an example source instruction construct 400, which is inputted by the instruction parser 204 and passed to the example error-detecting transaction generator 204 of FIG. 2. From the passed example source instruction construct 400 and an example designation 214 of FIG. 2 of a data flow error-detection, the example error-detecting transaction generator 204 of FIG. 2 forms an example error-detecting transaction 402. The example error-detecting transaction 402 is modified from an example designation of data-flow error-detection, such as the error-detecting designation 214 of FIG. 2.

Also shown in FIG. 4, the example source instruction construct 402 is modified such that, when the example error-detecting transaction 402 is executed, a mismatch of an incorrect data-movement or arithmetic instruction execution can be detected. When the example error-detecting transaction 402 executes, a mismatch of a logical instruction result (i.e., an instruction in a schematic) and a physical instruction result (i.e., an instruction in the execution) is detected. As discussed in below, the example error-detecting transaction 402 detects the error because a primary result of a primary computation is checked against a redundant result of a redundant computation. The added instructions are shown in boldface type throughout the example error-detecting transaction 402. In FIG. 4, a plurality of line numbers are offset by colons to represent a sequential instruction stream. In the discussion herein, the line number is provided, as a parenthetical expression (i.e., line #), for a reference to the respective instruction on the line number.

As discussed earlier, the example source instruction construct 400 is of the transaction construct form (i.e., Atomic . . . { } . . . orelse). The example source instruction construct 400 begins with a move ("MOV") instruction (line 40), which copies a second operand of a memory content location ("[mem]") to a first operand of a first register ("R1"). After the MOV instruction (line 40), the source instruction construct 400 follows with an add ("ADD") instruction (line 41), which performs an add operation on a first operand of the first register R1 and a second operand of the constant 1, and stores a result of the add operation to the first register R1. After the ADD instruction (line 41), the source instruction construct 400 follows with a MOV instruction (line 42), which copies the second operand of the first register R1 to a first operand of the memory content location [mem].

As illustrated within the example source instruction construct 400, a data-movement instruction (e.g., the MOV instruction) and an arithmetic instruction (e.g., the ADD instruction), which provide instructions that are effected by errors or other interference because of the movement of data from memory locations to registers, and the original value from the memory content location is destroyed with the second write (i.e., the MOV instruction in line 42).

The example error-detecting transaction 402 is of the transaction construct form (i.e., Atomic . . . { } . . . orelse). The example error-detecting transaction 402 begins a first move ("MOV") instruction (line 40), which copies a second operand of a memory content location ("[mem]") to a first operand of a first register ("R1"). The first MOV instruction (line 40) of the example error-detecting transaction 402 is the same as the MOV instruction (line 40) of the source instruction construct 400. After the first MOV instruction (line 40), the example error-detecting transaction 402 follows with a second MOV instruction (line 41), which copies a second operand of the first register R1 to a first operand of a second register ("R1'"). After the second MOV instruction (line 41), the example error-detecting transaction 402 follows with a first ADD instruction (line 42), which performs an add operation on a first operand of the first register R1 and a second operand of the constant 1, and stores a result of the add operation to the first register R1. After the first ADD instruction (line 42), the example error-detecting transaction 402 follows with a second ADD instruction (line 43), which performs an add operation on a first operand of the second register R1' and a second operand of the constant 1, and stores a result of the add operation to the second register R1'. After the second ADD instruction (line 43), the example error-detecting transaction 402 follows with CMP instruction (line 44), which compares a first operand of the first register R1 with a second operand of the second register R1'. The CMP instruction (line 44) subtracts the second operand of the second register R1' from the first operand of the first register R1 and sets the carry, sign, zero and overflow flags depending on whether the subtraction results in a carry out, a negative number, a zero, or an overflow, respectively. After the CMP instruction (line 44), the example error-detecting transaction 402 follows with a jump-if-not-zero instruction ("JNZ") (line 45), which checks the zero flag and jumps to the location of ".retry" (line 50) if the zero flag indicates the first operand of the first register R1 is not equal to the second operand of the second register R1'. In the instance of the jump to the ".retry" location (line 50), the "abort" instruction (line 51) aborts the example error-detecting transaction 402. If the zero flag indicates the first operand of the first register R1 is equal to the second operand of the second register R1', the example error-detecting transaction 402 follows with a second MOV instruction (line 46). The second MOV instruction (line 46) copies the second operand of the first register R1 to a first operand of the memory content location [mem]. The second MOV instruction (line 40) of the example error-detecting transaction 402 is the same as the second MOV instruction (line 42) of the source instruction construct 400.

When the example error-detecting transaction 402 executes, a mismatch of a logical instruction result (i.e., an instruction in a schematic) and a physical instruction result (i.e., an instruction in the execution) is detected. The example error-detecting transaction 402 detects the error because a primary result of a primary computation (e.g., line 42 of the example error-detecting transaction 402) is checked (e.g., line 44 of the example error-detecting transaction 402)

against a redundant result of a redundant arithmetic instruction (e.g., line 43 of the example error-detecting transaction 402). Although the example source instruction construct 400 exhibits the computation comprising one arithmetic instruction (e.g., the ADD instruction), the example source instruction 400 may be exhibit a computation comprising a plurality of arithmetic instructions. As a result of the plurality of arithmetic instructions in the computation, the example error-detecting transaction 402 may duplicate any number of the plurality of instruction and check the computations of the plurality of instructions any number of times.

Figure 5:
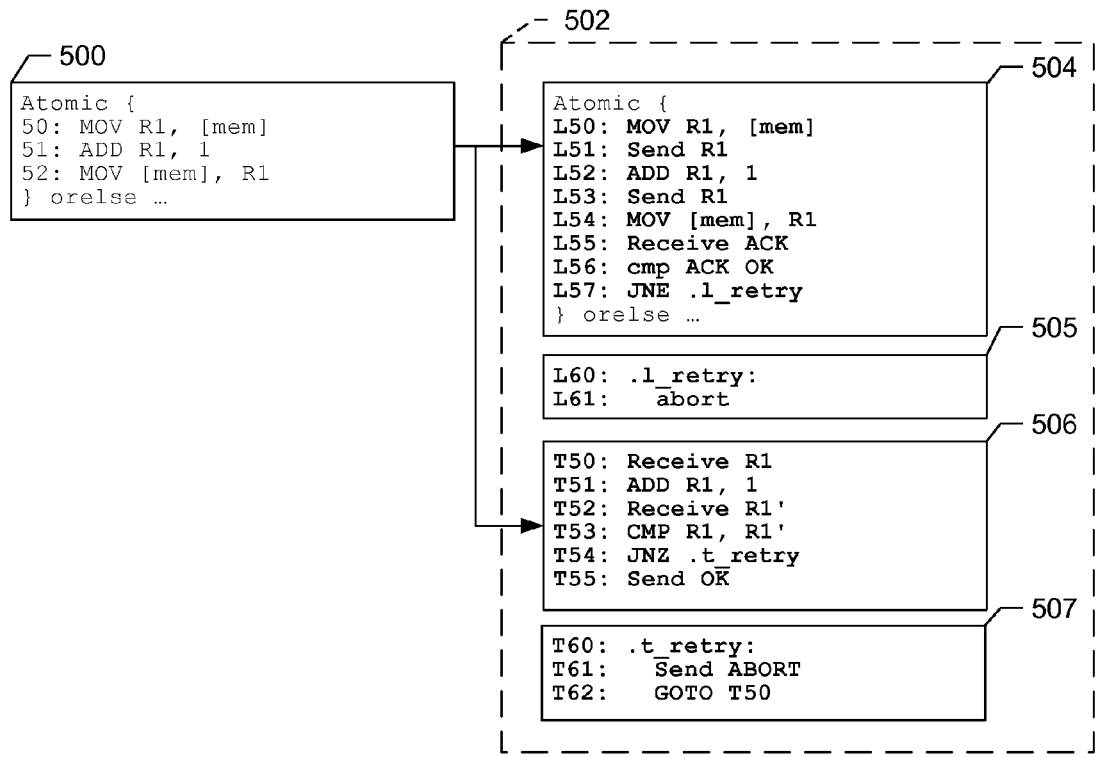
FIG. 5 is a third illustrative pseudocode of an example source instruction construct and a resulting example error-detecting formed by the example system of FIG. 2.

FIG. 5 provides illustrative pseudocode of an example source instruction construct 500, which is inputted to the instruction parser 204 and passed to the example error-detecting transaction generator 204 of FIG. 2. From the passed example source instruction construct 502 and an example designation 214 of FIG. 2 of a redundant-thread error-detection, the example error-detecting transaction generator 204 of FIG. 2 forms an example error-detecting transaction 402. Also shown in FIG. 5, the example error-detecting transaction 502 detects the mismatch of a logical instruction result (i.e., an instruction in a schematic) and a physical instruction result (i.e., an instruction in the execution). As shown below, the example error-detecting transaction 502 detects the error because two separate threads perform separate computations and compares those results. The added instructions are shown in boldface type throughout the example error-detecting transaction 502. In FIG. 5, a plurality of line numbers are offset by colons to represent a sequential instruction stream. In the discussion herein, the line number is provided, as a parenthetical expression (i.e., line #), for a reference to the respective instruction on the line number.

As discussed earlier, the example source instruction construct 500 is of the transaction construct form (i.e., Atomic . . . { } . . . orelse). The example source instruction construct 500 begins with a move ("MOV") instruction (line 50), which copies a second operand of a memory content location ("[mem]") to a first operand of a first register ("R1"). After the MOV instruction (line 50), the source instruction construct 500 follows with an add ("ADD") instruction (line 51), which performs an add operation on a first operand of the first register R1 and a second operand of the constant 1, and stores a result of the add operation to the first register R1. After the ADD instruction (line 51), the source instruction construct 400 follows with a MOV instruction (line 52), which copies the second operand of the first register R1 to a first operand of the memory content location [mem].

The example error-detecting transaction 502 is shown with two separate threads (i.e., two separate sequential execution streams within a main program) including a leading thread 504 and a trailing thread 506. The leading thread 504 and the trailing thread 506 can be executed in a common address space with a physical (i.e., shared memory, common hardware bus, etc.) or an instructional inter-thread communication for message passing. As shown, the trailing thread 506 can be spawned in the main program. In the example error-detecting transaction 502, a plurality of line numbers with a letter prefix are offset by colons to provide a sequential instruction stream either in the leading thread 504 or the trailing thread 506. The line numbers with an "L" prefix represent a sequential instruction stream within the leading thread 504. Alternatively, the line numbers with a "T" prefix represent a sequential instruction stream within the trailing thread 506. In the discussion herein, the line number with the letter prefix is provided, as a parenthetical expression (i.e., line #), for a reference to the respective instruction on the line number.

As shown, the example error-detecting transaction 502 is of the transaction construct form (i.e., Atomic . . . { } . . . orelse) in the leading thread 504, and of a non-transaction construct form in the trailing thread 506. The leading thread 504 of the example error-detecting transaction 502 begins with a move ("MOV") instruction (line L50), which copies a second operand of a memory content location ("[mem]") to a first operand of a first register ("R1"). After the MOV instruction (line L50), the leading thread 504 follows with a first send ("Send") instruction (line L51), which performs a message passing operation to send a first copy of an operand of the first register R1 to the trailing thread 506. As discussed above, the execution streams of the leading thread 504 and the trailing thread 506 are separate sequential execution streams within the main program; therefore, the message passing can be performed through the example implementations above. After the first Send instruction (line L51), the leading thread 504 follows with an add ("ADD") instruction (line L52), which performs an add operation on a first operand of the first register R1 and a second operand of the constant 1, and stores a result of the add operation to the first register R1. After the ADD instruction (line L53), the leading thread 504 follows with a second Send instruction (line L55), which performs a message passing operation to send a second copy of an operand of the first register R1 to the trailing thread 506. After the second Send instruction (line L55), the leading thread 504 follows with a MOV instruction (line L54), which copies the second operand of the first register R1 to a first operand of the memory content location [mem]. After the MOV instruction (line L54), the leading thread 504 follows with a receive ("Receive") instruction (line L55), which performs a message passing operation to receive a signal from the trailing thread 506 before proceeding.

As separate sequential execution streams within the main program, the trailing thread 506 executes sequentially, but waits to proceed on Receive instructions for signals from the leading thread 504. The trailing thread 506 of the example error-detecting transaction 502 begins with a first Receive instruction (line T50), which performs a message passing operation to receive the first copy of the operand of the first register R1 from the leading thread 504. After the Receive instruction (line T50), the trailing thread 506 follows with an ADD instruction (line T52), which performs an add operation on the first operand of the first received R1 and a second operand of the constant 1, and stores a result of the add operation to the first register R1. After the ADD instruction (line T52), the trailing tread 506 follows with a second Receive instruction (line T53), which performs a message passing operation to receive the second copy of the operand of the first register R1 from the leading thread 504 and to store the second copy of the operand of the first register R1 to a second register ("R1'"). After the second Receive instruction (line T52), the trailing thread 506 follows with a CMP instruction (line T53), which compares a first operand of the first register R1 with a second operand of the second register R1'. The CMP instruction (line T53) subtracts the second operand of the second register R1' from the first operand of the first register R1 and sets the carry, sign, zero and overflow flags depending on whether the subtraction results in a carry out, a negative number, a zero, or an overflow, respectively. After the CMP instruction (line T53), the trailing thread 506 follows with a jump-if-not-zero instruction ("JNZ") (line T54), which checks the zero flag and jumps to the location of ".t_retry" (line T60) if the zero flag indicates the first operand of the first register R1 is not equal to the second operand of the second register R1'. In the instance of the jump to the ".t_retry" location (line T60), a Send instruction performs a message passing to send an abort signal "ABORT" to the leading thread 504 (line T61) and a go to instruction "GOTO" branchs to line T50 of the trailing thread 506 (line T62). The leading tread 504 receives the acknowledge signal "ACK" (line L55) and compares the received "ABORT" to an "OK" acknowledge signal and jumps to ".1_retry" location (line L60). Thus, the "abort" instruction (line L61) aborts the leading thread 504 and the trailing thread 507 of the example error-detecting transaction 502. If the zero flag indicates the first operand of the first register R1 is equal to the second operand of the second register R1', the trailing thread 506 follows with a Send instruction (line T55). The Send instruction (line T55) performs a message passing operation to send an "OK" signal to the leading thread 504 (line T61). The leading thread 504 receives the acknowledge signal "ACK" (line L55) and compares the received "OK" signal to an expected "OK" signal and, thus, does not abort the example error-detecting transaction 502, as discussed above.

When the example error-detecting transaction 502 executes, a mismatch of a logical instruction result (i.e., an instruction in a schematic) and a physical instruction result (i.e., an instruction in the execution) is detected. The example error-detecting transaction 502 detects the error because two separate threads (i.e., the leading thread 504 and the trailing thread 506) perform separate computations, whose results are checked (e.g., line T53 of the example error-detecting transaction 502). If an error or other interference is detected, the example error-detecting transaction 502 aborts any changes made. Although the example source instruction construct 500 exhibits the computation comprising one arithmetic instruction (e.g., the ADD instruction), the example source instruction 500 may be exhibit a computation comprising a plurality of arithmetic instructions. As a result of the plurality of arithmetic instructions in the computation, the example error-detecting transaction 502 may duplicate any number of the plurality of instruction and check the computations of the plurality of instructions any number of times.

Figure 6:
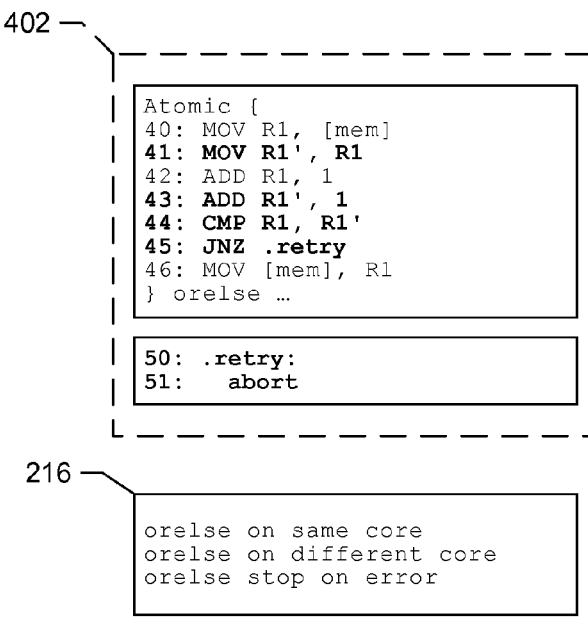
FIG. 6 is a pseudocode of a source instruction construct for generating an example error-recovery instruction generator.

FIG. 6 provides illustrative pseudocode of an example source instruction construct 102 of FIG. 2 that was modified by the error-detecting transaction generator 204 of FIG. 2 to form an example error-detecting transaction 402, as discussed above in FIG. 4, and passed to the error-recovery instruction generator 208 of FIG. 2. Additionally, FIG. 6 provides example error-recovery designations 216 inputted by the example error-recovery instruction generator 206 in the form of a first example syntactical instruction "orelse on same core", a second example syntactical instruction "orelse on different core", and a third example syntactical instruction "or else stop on error".

The example error-recovery instruction generator 208 of FIG. 2 creates instructions for a handler or scheduler associated with an example multi-core computing platform to migrate a second execution of the example error-detecting transaction 402 to the same core as the first execution of the error-detecting transaction 402. In addition, the example error-recovery instruction generator 208 of FIG. 2 creates instructions for the scheduler to migrate a third execution of the example error-detecting transaction 402 to a different core than the first and second execution of the error-detecting transaction 402. Moreover, the example error-recovery instruction generator 208 of FIG. 2 creates instructions for the scheduler to stop execution of the example error-detecting transaction 402 after the first and second execution of the error-detecting transaction 402. For example, these subsequent instructions may invoke runtime instruction such as operating system calls to create a new thread or any other known or future ways to migrate threads on an example computing platform. In the example of FIG. 6, the first, second, and third execution are the same instruction sequence of the example error-detecting transaction (i.e., lines 40-46 of 402). Additionally or alternatively, the example error-recovery instructions may be implemented to execute any number of instruction sequences on the example multi-core computing platform that may differ from the example error-detecting transaction 402. For example, the error-recovery instructions may report the error(s) and/or execute a different error-detecting transaction.

Therefore, when the error-detecting transaction 402 is executed and the "JNZ" instruction (line 45 of 402) jumps to ".retry" (line 50 of 402), which executes the "abort" instruction (line 51 of 402) to abort the error-detecting transaction 402, the example scheduler migrates the example first error-detecting transaction 402 to execute on the same core as first executed on. Further, if the second execution of the example first error-detecting transaction 402 also aborts, the example scheduler then migrates the example error-detecting transaction 402 to execute on a different core of the example multi-core computing platform. Subsequently, the example error-detecting transaction 402 is aborted and not scheduled for a third execution. With such an execution sequence, a permanent error or failure associated with the first core (i.e., the core that first executed the example error-detecting transaction 402) can be identified. Additionally with such an execution sequence, a transient error can be detected quickly when the second execution of the example error-detecting transaction 402 does not abort. Thus, the instruction sequence can proceed with little overhead.

3. Instruction Execution

Flow diagrams representative of example machine readable instructions that can be executed to implement the resilient objective instruction construct 106 of FIG. 2 are shown in FIGS. 7-10. In these examples, the machine readable instructions comprise one or more example programs for execution by a processor, such as the processor 1105 shown in the example processor system 1100 of FIG. 11. The program(s) may be embodied in software stored on a tangible medium such as a CD-ROM, a floppy disk, a hard drive, a digital versatile disk (DVD), or a memory associated with the processor 1105, but persons of ordinary skill in the art will readily appreciate that the entire program(s) and/or parts thereof could alternatively be executed by a device other than the processor 1105 and/or embodied in firmware or dedicated hardware in a well known manner. For example, any or all of the instruction parser 204, the error-detecting transaction generator 206, the error-recovery instruction generator 208, and/or the objective instruction optimizer 210 of FIG. 2 could be implemented by firmware, hardware, and/or software. Further, although the example program(s) are described with reference to the flow diagrams illustrated in FIGS. 7-10, persons of ordinary skill in the art will readily appreciate that many other methods of implementing the example program (s) may alternatively be used. For example, the order of execution of the blocks may be changed, and/or some of the blocks described may be changed, eliminated, or combined. Similarly, the execution of the example program(s) and the each block in the example program(s) can be performed iteratively.

The example process 700 begins by executing an error-detecting transaction (block 702). If the error-detecting transaction does not indicate an abort (block 704), the example process 700 commits the changes from executing the error-detecting transaction in block 702 (block 706) and ends (block 722). If the error-detecting transaction indicates an abort (block 704), the example process 700 discards the changes from the executing the error-detecting transaction in block 702 (block 708). If the error-recovery instructions indicate an example "stop on error" instruction (block 710), the example process 700 reports the error(s) identified from the abort(s) indicated from block 704 (block 720). After indicating the error(s), the example process 700 ends (block 722).

If the error-recovery instructions do not indicate an example "stop on error" instruction (block 710), a new error-detecting transaction (block 716), and a continued execution on the same core (block 712), the example process 700 repeats the execution of the same error-detecting transaction on the same core (block 702). Alternatively, if the error-recovery instructions do not indicate an example "stop on error" instruction (block 710) but do indicate a new error-detecting transaction (block 716) and a continued execution on the same core (block 712), the example process 700 executes a new error-detecting transaction on the same core (block 718).

If the error-recovery instructions do not indicate an example "stop on error" instruction (block 710) and instead indicate to continue execution on a different core (block 712), the example process 700 migrates to a different core (block 714). If migrated to a different core (block 714) and the error-recovery instructions do not indicate a new error-detecting transaction (block 716), the example process 700 repeats the execution of the same error-detecting transaction on a different core (block 702). Alternatively, if migrated to a different core (block 714) and the error-recovery instructions indicate a new error-detecting transaction (block 716), the example process 700 executes a second error-detecting transaction on a different core (block 718).

Figure 7:
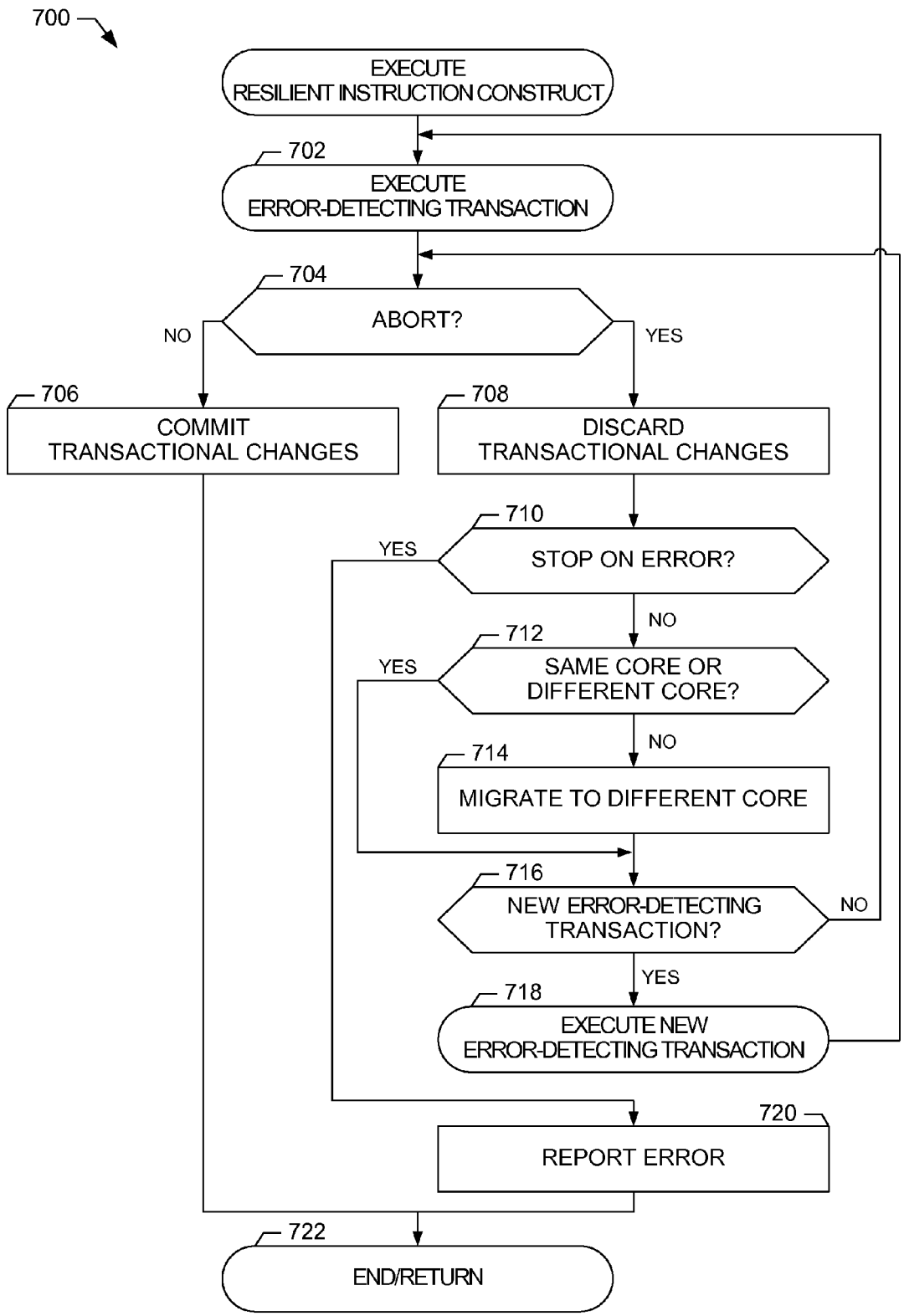
FIG. 7 is a flow diagram of an example process of a resilient objective instruction construct.
Figure 8:
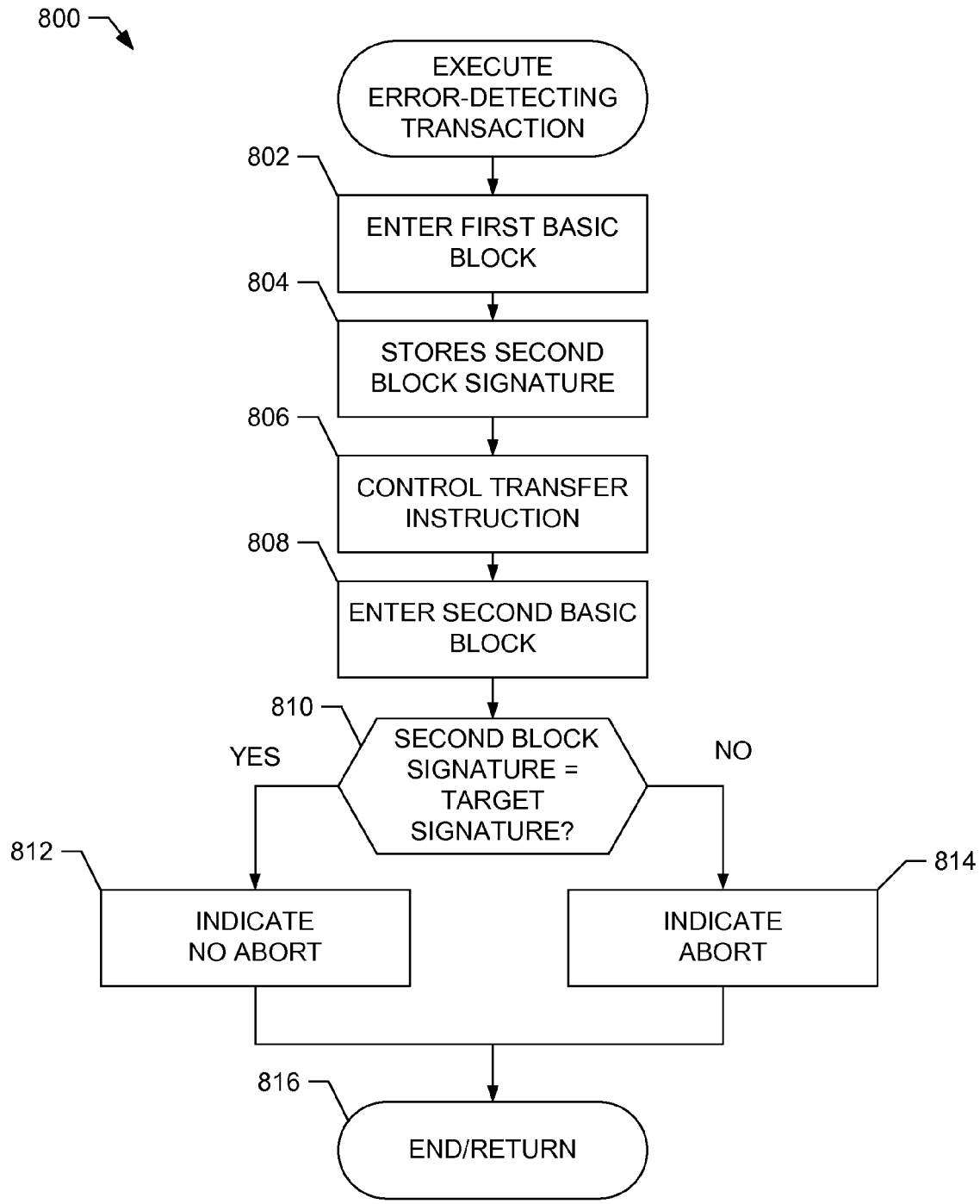
FIG. 8 is a flow diagram of a first example error-detection transaction process of the example process of FIG. 7.

FIG. 8 is a flow diagram of a first example error-detecting transaction 800 executed by the example process 700 of FIG. 7 (block 702 and/or block 718). The first example error-detecting transaction 800 begins by executing a first basic block (block 802). The first example error-detecting transaction 800 stores a signature of a second basic block (block 804), before executing a control transfer function that causes the sequential instruction stream of the first basic block to end. After storing the signature of the second basic block (block 804), the first example error-detecting transaction 800 executes a control transfer instruction (block 806). After executing the control transfer instruction (block 806), the first example error-detecting transaction 800 enters the second basic block (block 808). The first example error-detecting transaction 800 checks the signature of the second block against the stored signature from block 804, which sets the signature to a constant, and determines if an error or other interference has caused an incorrect control transfer to the second block (block 810). If the check demonstrates no interference (block 810), the first example error-detecting transaction 800 indicates no abort (block 812) and the first example error-detecting transaction 800 returns to the example process 700 (block 816). If the check demonstrates interference (block 810), the first example error-detecting transaction 800 indicates an abort (block 814) and returns to the example process 700 (block 816).

Figure 9:
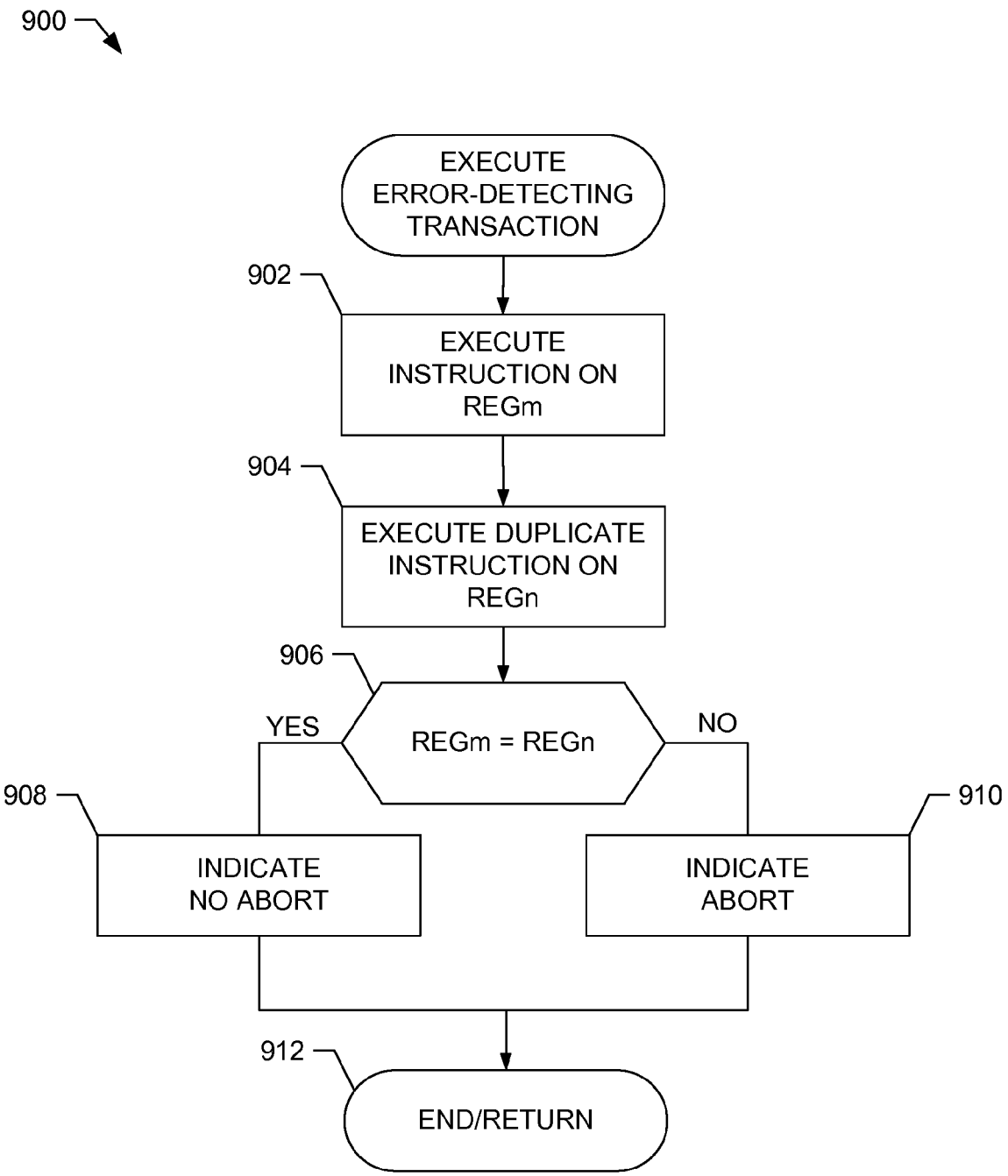
FIG. 9 is a flow diagram of a second example error-detection transaction process of the example process of FIG. 7.

FIG. 9 is a flow diagram of a second example error-detecting transaction 900 executed by the example process 700 of FIG. 7 (block 702 and/or block 718). The second example error-detecting transaction 900 begins by executing an instruction, for example, an arithmetic instruction, on a first register "REGm" (block 902). After executing the instruction on the first register "REGm" (block 902), the second example error-detecting transaction 900 executes the instruction on a second register "REGn" (block 904). After executing the instruction on the second register "REGn" (block 904), the second example error-detecting transaction 900 compares the results of the instruction from the first register "REGm" with the second register "REGn" and determines an error or other interference from a mismatch of the results (block 906). If the check demonstrates no interference (block 906), the second example error-detecting transaction 900 indicates no abort (block 908) and the second example error-detecting transaction 900 returns to the example process 700 (block 912). If the check demonstrates interference (block 906), the second example error-detecting transaction 900 indicates an abort (block 910) and returns to the example process 700 (block 912).

Figure 10:
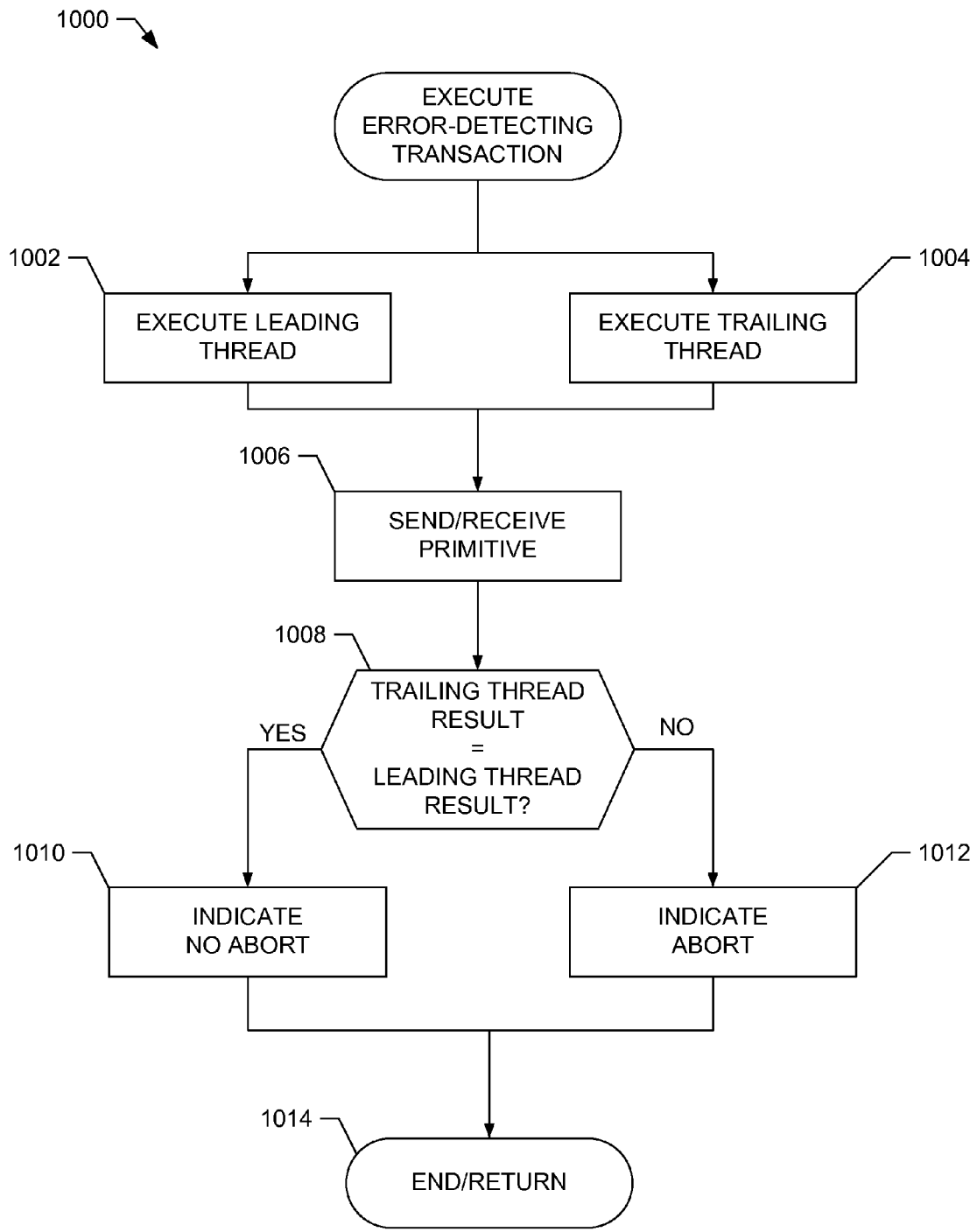
FIG. 10 is a flow diagram of a third example error-detection transaction process of the example process of FIG. 7.

FIG. 10 is a flow diagram of a third example error-detecting transaction 1000 executed by the example process 700 of FIG. 7 (block 702 and/or block 718). The third example error-detecting transaction 1000 begins by executing a leading thread (block 1002) and a trailing thread (block 1004). The leading thread and the trailing thread have instructions within respective sequential streams of instructions that generate one or more comparable results. After executing the leading thread (block 1002) and the trailing thread (block 1004), the example error-detecting transaction 1000 executes a send/receive primitive between the leading thread and the trailing thread to exchange the respective comparable results (block 1006). After the send/receive primitive (block 1006), the third example error-detecting transaction 1000 compares the result of the leading thread with the result of the trailing thread and determines an error or other interference from a mismatch of the results (block 906). If the check demonstrates no interference (block 1008), the third example error-detecting transaction 1000 indicates no abort (block 1010) and the third example error-detecting transaction 1000 returns to the example process 700 (block 1014). If the check demonstrates interference (block 1008), the third example error-detecting transaction 1000 indicates an abort (1112) and returns to the example process 700 (block 1014).

Figure 11:
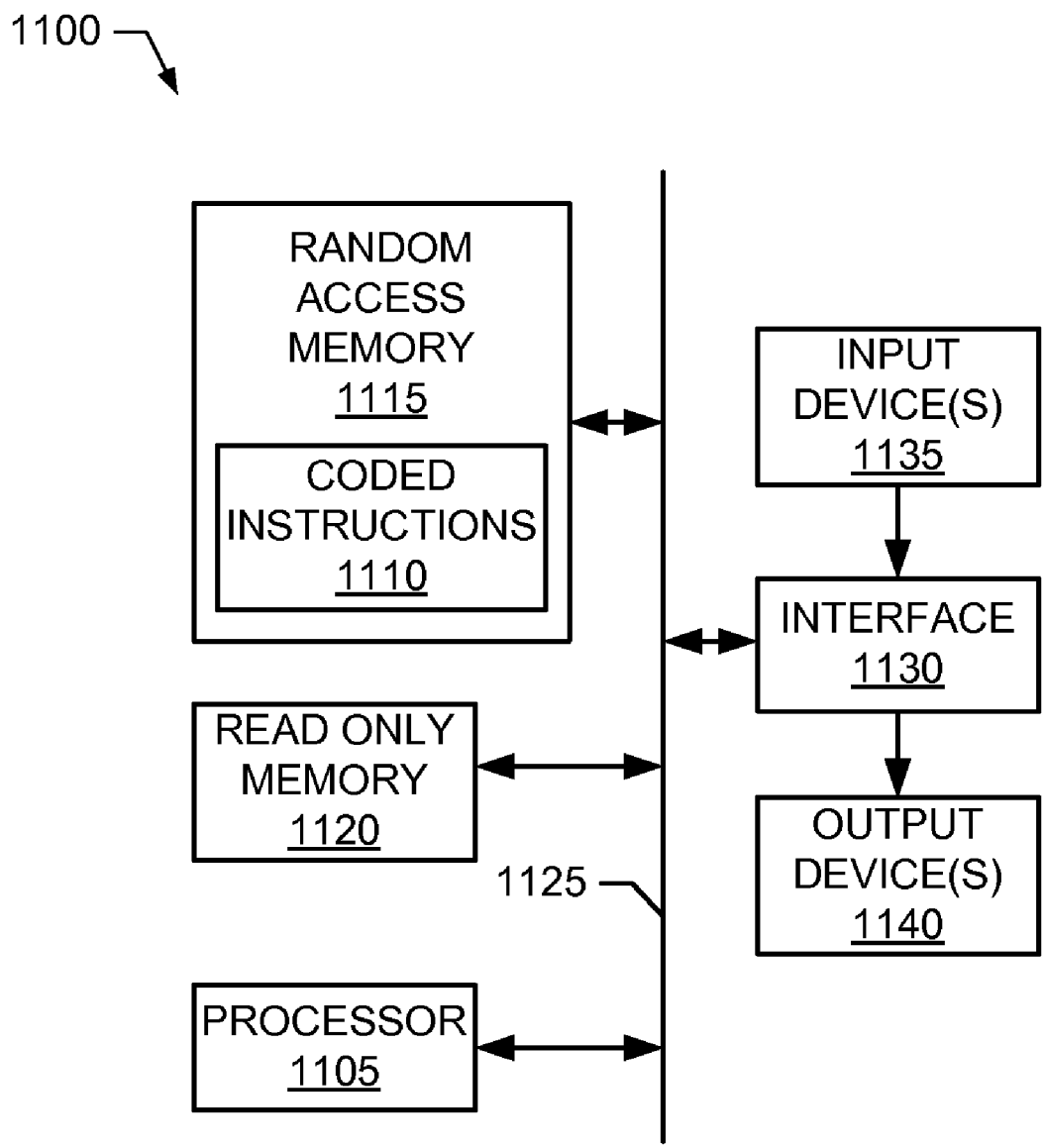
FIG. 11 is a schematic illustration of an example computing platform that may be used to implement the processes, methods, and apparatus described herein.

FIG. 11 is a schematic diagram of an example processor platform 1100 that may be used and/or programmed to implement the resilient transaction compiler 104 of FIG. 1, including the instruction parser 204, the error-detecting transaction generator 206, the error-recovery instruction generator 208, and the objective instruction optimizer 120. For example, the processor platform 1100 can be implemented by one or more general purpose single-thread and/or multi-threaded processors, cores, microcontrollers, etc. The processor platform 1100 may also be implemented by one or more computing devices that contain any of a variety of concurrently-executing single-thread and/or multi-threaded processors, cores, microcontrollers, etc.

The processor platform 1100 of the example of FIG. 11 includes at least one general purpose programmable processor 1105. The processor 1105 executes coded instructions 1110 present in main memory of the processor 1105 (e.g., within a RAM 1115). The coded instructions 1110 may be used to implement the instructions represented by the example pseudocode error-detecting transaction processes 302, 402, and 502, the resiliency designations 212, the error-detecting designations 214, error-recovery designations 216, and the example programs of FIGS. 7-10. The processor 1105 may be any type of processing unit, such as a processor core, processor and/or microcontroller. The processor 1105 is in communication with the main memory (including a read-only memory (ROM) 1120 and the RAM 1115) via a bus 1125. The RAM 1115 may be implemented by dynamic RAM (DRAM), Synchronous DRAM (SDRAM), and/or any other type of RAM device, and ROM may be implemented by flash memory and/or any other desired type of memory device.

Access to the memory 1115 and 1120 may be controlled by a memory controller (not shown).

The processor platform 1100 also includes an interface circuit 1130. The interface circuit 1130 may be implemented by any type of interface standard, such as an external memory interface, serial port, general purpose input/output, etc. One or more input devices 1135 and one or more output devices 1140 are connected to the interface circuit 1130.

As an alternative to implementing the methods and/or apparatus described herein in a system such as the device of FIG. 11, the methods and/or apparatus described herein may alternatively be embedded in a structure such as processor and/or an ASIC (application specific integrated circuit).

From the foregoing, persons of ordinary skill in the art will appreciate that the above disclosed methods and apparatus may be implemented in a static compiler, a managed run-time environment just-in-time compiler (JIT), and/or directly in the hardware of a microprocessor to achieve performance optimization in executing various programs.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    obtaining a source instruction construct; and
    forming a resilient objective instruction construct by compiling one or more resilient transactions.

2. A method as defined in claim 1, wherein compiling one or more resilient transactions comprises:
    parsing a first section of the source instruction construct to generate a first error-detecting transaction;
    generating the first error-detecting transaction associated with the first section; and
    generating one or more error-recovery instructions associated with the first error-detecting transaction.

3. A method as defined in claim 2, wherein compiling one or more resilient transactions further comprises:
    parsing a second section of the source instruction construct to generate a second error-detecting transaction;
    generating the second error-detecting transaction associated with the second section; and
    generating one or more error-recovery instructions associated with the second error-detecting transaction.

4. A method as defined in claim 2, wherein parsing the first section of the source instruction construct to generate the first error-detecting transaction comprises obtaining one or more designations.

5. A method as defined in claim 2, wherein generating the first error-detecting transaction associated with the first section comprises:
    generating one or more error-detecting instructions; and
    modifying the first section with the generated one or more error-detecting instructions to form the first error-detecting transaction.

6. A method as defined in claim 5, wherein generating the error-detecting instructions comprises:
    separating the first section into at least a first basic block and a second basic block;
    assigning a first signature value to the first basic block and a second signature value to the second basic block;
    storing the first signature value to a first register and the second signature value to a second register;
    duplicating at least one instruction from the first basic block to create at least one redundant computation in the first basic block;
    moving the second signature value from the second register to the first register based on the redundant computation;
    comparing the first register to the second signature value; and
    creating an abort based on the comparison.

7. A method as defined in claim 6, wherein comparing the first register to the second signature value comprises changing the value of the first register to a value that does not equal the first signature value and the second signature value.

8. A method as defined in claim 5, wherein generating error-detecting instructions for the error-detecting transaction comprises:
    duplicating at least one instruction from the first section to create a primary computation and at least one redundant computation;
    comparing at least one result associated with the primary computation with at least one result associated with the redundant computation; and
    creating an abort based on the comparison.

9. A method as defined in claim 5, wherein generating error-detecting instructions for the error-detecting transaction comprises:
    replicating a thread of the first section to create a leading thread and at least one trailing thread;
    comparing at least one result associated with the leading thread with at least one result associated with the trailing thread; and
    creating an abort based on the comparison.

10. A method as defined in claim 2, wherein generating one or more error-recovery instructions associated with the first error-detecting transaction comprises:
    migrating a first execution of the first error-detecting transaction to a first core associated with a multi-core computing platform; and
    if the first execution of the first error-detecting transaction aborts, migrating a second execution of the first error-detecting transaction to the first core associated with the many-core computing platform.

11. A method as defined in claim 2, wherein generating one or more error-recovery instructions associated with the first error-detecting transaction comprises:
    migrating a first execution of the first error-detecting transaction to a first core associated with a multi-core computing platform; and
    if the first execution of the first error-detecting transaction aborts, migrating a second execution of the first error-detecting transaction to a second core associated with the many-core computing platform.

12. A method as defined in claim 2, wherein generating one or more error-recovery instructions associated with the first error-detecting transaction comprises:

migrating a first execution of the first error-detecting transaction to a first core associated with a multi-core computing platform; and if the first execution of the first error-detecting transaction aborts, migrating a first execution of a second error-detecting transaction to the first core associated with the many-core computing platform.

13. A method as defined in claim 2, wherein generating one or more error-recovery instructions associated with the first error-detecting transaction comprises:

migrating a first execution of the first error-detecting transaction to a first core associated with a multi-core computing platform; and if the first execution of the first error-detecting transaction aborts, migrating a first execution of a second error-detecting transaction to a second core associated with the many-core computing platform.

14. A tangible article of manufacture storing machine readable instructions which, when executed, cause a machine to at least:

obtain a source instruction construct; and form a resilient objective instruction construct by compiling one or more resilient transactions.

15. An article of manufacture as defined in claim 14, wherein the machine readable instructions cause the machine to compile one or more resilient transactions by at least:

parsing a first section of the source instruction construct to generate a first error-detecting transaction and a second section of the source instruction construct to generate a second error-detecting transaction;

generating the first error-detecting transaction associated with the first section and the second error-detecting transaction associated with the second section; and generating one or more error-recovery instructions associated with the first error-detecting transaction and one or more error-recovery instructions associated with the second error-detecting transaction.

16. An article of manufacture as defined in claim 14, wherein the machine readable instructions cause the machine to at least parse the first section of the source instruction construct to generate the first error-detecting transaction and the second section of the source instruction construct to generate the second error-detecting transaction by obtaining one or more designations.

17. An article of manufacture as defined in claim 15, wherein the machine readable instructions cause the machine to generate the first error-detecting transaction associated with the first section by at least:

generating one or more error-detecting instructions; and modifying the first section with the generated one or more error-detecting instructions to form the first error-detecting transaction.

18. An article of manufacture as defined in claim 17, wherein the machine readable instructions, when executed, cause the machine to at least generate one or more error-detecting instructions that:

separate the section into at least a first basic block and a second basic block;

assign a first signature value to the first basic block and a second signature value to the second basic block;

store the first signature value to a first register and store the second signature value to a second register;

duplicate at least one instruction from the first basic block to create at least one redundant computation in the first basic block;

move the second signature value from the second register to the first register based on the redundant computation;

compare the first register to the second signature value; and create an abort based on the comparison.

19. An article of manufacture as defined in claim 18, wherein the machine readable instructions, when executed, cause the machine to at least generate one or more error-detecting instructions that compare the first register to the second signature value, wherein comparing the first register to the second signature value changes the value of the first register to a value that does not equal the first signature value and the second signature value.

20. An article of manufacture as defined in claim 17, wherein the machine readable instructions, when executed, cause the machine to at least generate one or more error-detecting instructions that:

duplicate at least one instruction from the first section to create a primary computation and at least one redundant computation;

compare at least one result associated with the primary computation with at least one result associated with the redundant computation; and create an abort based on the comparison.

21. An article of manufacture as defined in claim 17, wherein the machine readable instructions, when executed, cause the machine to at least generate one or more error-detecting instructions that:

replicate a thread of the first section to create a leading thread and at least one trailing thread;

compare at least one result associated with the leading thread with at least one result associated with the trailing thread; and create an abort based on the comparison.

22. An article of manufacture as defined in claim 14, wherein the machine readable instructions, when executed, cause the machine to at least generate one or more error-recovery instructions associated with the first error-detecting transaction that:

migrate a first execution of the first error-detecting transaction to a first core associated with a multi-core computing platform; and if the first execution of the first error-detecting transaction aborts, migrate a second execution of the first error-detecting transaction to the first core associated with the many-core computing platform.

23. An article of manufacture as defined in claim 14, wherein the machine readable instructions, when executed, cause the machine to at least generate one or more error-recovery instructions associated with the first error-detecting transaction that:

migrate a first execution of the first error-detecting transaction to a first core associated with a multi-core computing platform; and if the first execution of the first error-detecting transaction aborts, migrate a second execution of the first error-detecting transaction to a second core associated with the many-core computing platform.

24. An article of manufacture as defined in claim 14, wherein the machine readable instructions, when executed, cause the machine to at least generate one or more error-recovery instructions associated with the first error-detecting transaction that:

migrate a first execution of the first error-detecting transaction to a first core associated with a multi-core computing platform; and if the first execution of the first error-detecting transaction aborts, migrate a first execution of a second error-detecting transaction to the first core associated with the many-core computing platform.

25. An article of manufacture as defined in claim 14, wherein the machine readable instructions, when executed, cause the machine to at least generate one or more error-recovery instructions associated with the first error-detecting transaction that:

migrate a first execution of the first error-detecting transaction to a first core associated with a multi-core computing platform; and if the first execution of the first error-detecting transaction aborts, migrate a first execution of a second error-detecting transaction to a second core associated with the many-core computing platform.

26. An apparatus comprising a resilient transaction compiler including a processor to:

obtain a source instruction construct; and form a resilient objective instruction construct by compiling one or more resilient transactions.

27. An apparatus as defined in claim 26, wherein the resilient transaction compiler comprises:

an instruction parser to parse a section of the source instruction construct to generate an error-detecting transaction;

an error-detecting transaction generator to generate the error-detecting transaction associated with the parsed section;

an error-recovery instruction generator to generate one or more error-recovery instructions associated with the parsed section; and an objective instruction optimizer to form the resilient objective instruction construct by compiling the error-detecting transaction, the error-recovery instructions, and the source instruction construct.

28. An apparatus as defined in claim 27, wherein the instruction parser is to:

input one or more resiliency designations to differentiate the section of the source instruction construct; and parse the differentiated section of the source instruction construct to at least one of the error-detecting transaction generator, the error-recovery instruction generator, and the objective instruction optimizer.

29. An apparatus as defined in claim 27, wherein the error-detecting transaction generator is to generate the error-detecting transaction associated with the parsed section by:

obtaining the parsed section of the source instruction construct;

inputting at least one error-detecting designation;

generating error-detecting instructions; and modifying the parsed section with the generated error-detecting instructions to form the error-detecting transaction.

30. An apparatus as defined in claim 27, wherein the error-recovery instruction generator to generate one or more error-recovery instructions associated with the parsed section by:

obtaining the parsed section of the source instruction construct;

inputting one or more error-recovery designations;

generating the error-detecting instructions; and modifying the parsed section with the generated error-detecting instructions to form the error-detecting transaction.

\* \* \* \* \*